United States Patent
Horstmann

(10) Patent No.: US 6,655,261 B1
(45) Date of Patent: Dec. 2, 2003

(54) TEA/COFFEE POT WITH PIVOTING STRAINER

(75) Inventor: Klaus Horstmann, Neuenkirchen (DE)

(73) Assignee: Emsa Werke Wulf GmbH & Co. KG, Emsdetten (DE)

( * ) Notice: Subject to any disclaimer, the term of this patent is extended or adjusted under 35 U.S.C. 154(b) by 0 days.

(21) Appl. No.: 09/763,031
(22) PCT Filed: Aug. 31, 1999
(86) PCT No.: PCT/EP99/06383
§ 371 (c)(1), (2), (4) Date: Jun. 6, 2001
(87) PCT Pub. No.: WO00/11991
PCT Pub. Date: Mar. 9, 2000

(30) Foreign Application Priority Data

Aug. 31, 1998 (DE) ..................................... 298 15 636 U

(51) Int. Cl.⁷ ............................................... A47J 31/18
(52) U.S. Cl. ............................. 99/319; 99/318; 99/323; 99/323.3; 210/238; 210/464
(58) Field of Search ......................... 99/318, 319, 322, 99/323, 323.3; 210/237, 238, 464

(56) References Cited

U.S. PATENT DOCUMENTS

| 1,412,674 A | | 4/1922 | Campbell | |
|---|---|---|---|---|
| 1,424,774 A | * | 8/1922 | Pearl | 99/319 |
| 2,099,996 A | * | 11/1937 | Beling | 99/319 |
| 2,343,017 A | | 2/1944 | Mattoon | |
| 4,482,083 A | | 11/1984 | Beck | |
| 5,609,092 A | * | 3/1997 | Chen | 99/319 |

FOREIGN PATENT DOCUMENTS

| DE | 42 07 453 | 11/1993 |
|---|---|---|
| DE | 44 32 547 | 3/1996 |

* cited by examiner

Primary Examiner—Reginald L. Alexander
(74) Attorney, Agent, or Firm—Young & Thompson

(57) ABSTRACT

A tea/coffee pot includes a pot body designed to be filled with a liquid, and a strainer body which is arranged therein and is pivotable by way of a handling device between a submerged position and an emerged position. The strainer body includes at least one compartment for receiving an additional substance, such as tea leaves, ground coffee. The handling device includes a pull element for pivoting the strainer body, and the pot body has a guiding device in which the pull element is displaceably guided along a predetermined path for pivoting the strainer body.

39 Claims, 8 Drawing Sheets

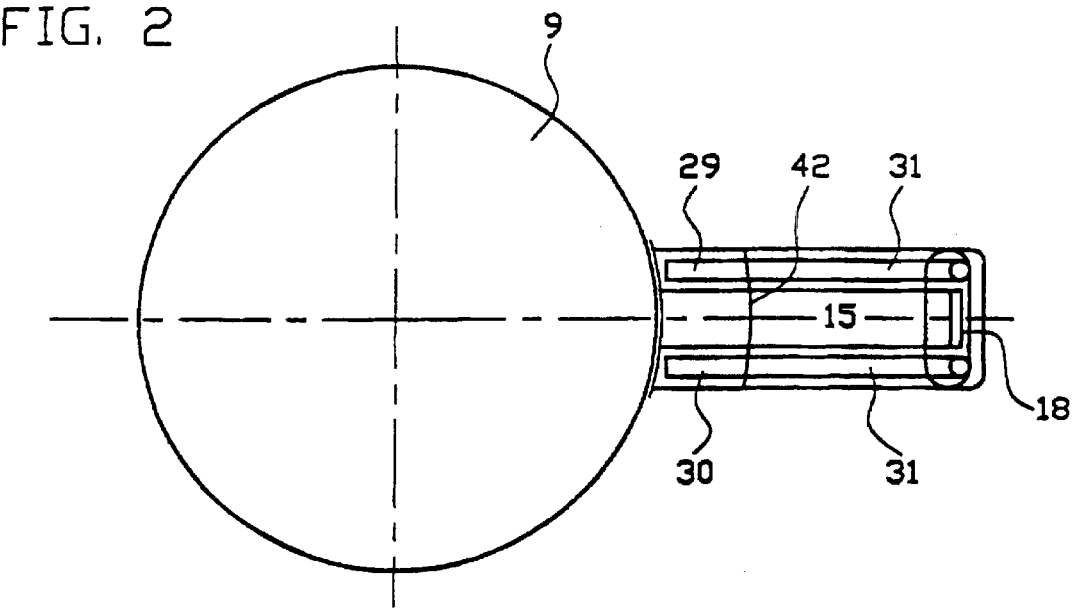
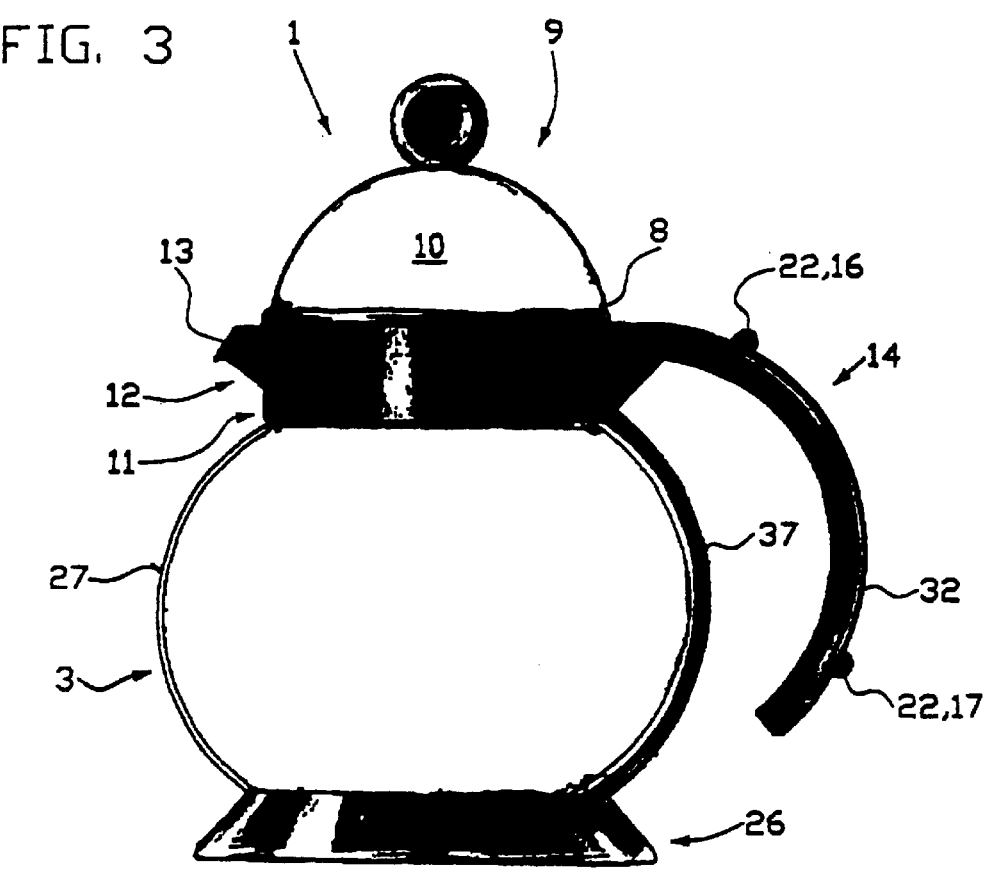

TEA/COFFEE POT WITH PIVOTING STRAINER

BACKGROUND OF THE INVENTION

The present invention relates to a tea/coffee pot comprising a pot body designed to be filled with a liquid, and a strainer body which is arranged therein and is pivotable by means of a handling device between a submerged position and an emerged position and which comprises at least one compartment for receiving an additional substance, such as tea leaves, ground coffee, or the like.

A generic tea pot comprising a tea receiving device is known from DE 44 32 547 A1. Said hollow semispherical pot is provided in the area of its handle with a pivot bearing in the form of an upwardly oriented, projecting flat body. The pivot bearing is arranged at the upper end of the handle and serves to receive an opening of a pivot lever whose one end has arranged thereon a spherical strainer body. The opening inside the pivot lever is positioned in the central area of the pivot lever, but at a greater distance relative to the strainer body than to the opposite end. The lever portion which is designed as a handling device at the other side of the opening is adapted to the contour of the handle and can be locked thereonto. In the non-locked state, the strainer body is in a downwardly pivoted position so that the body can be submerged, for instance into hot water, if necessary (submerged position). The strainer body is located in this position near the bottom of the pot body. The strainer body is pivoted upwards into a position substantially above the water surface (emerged position) by a user pressing onto the upper side of the handling portion of the pivot lever. As soon as the handling area has come into contact with the outer contour of the handle, a locking operation is performed by means of an arresting device, so that the strainer body is held in this lifted position.

Such a configuration has the drawback that a relatively long lever arm section must be present between the pivot bearing and the strainer body to sufficiently lift and lower the same. However, to prevent any disturbing action of the handling area of the lever arm, the arm must not exceed a specific length in practice. This results in disadvantageous lever ratios, whereby the force to be applied must be relatively high on the one hand. On the other hand, the force cannot be applied in very accurately metered amounts, so that the strainer body is sometimes virtually flung out of the liquid and is suddenly stopped by the abutment of the handling area on the handle. That is why an anti-splash means must be provided at any rate so that no liquid is thrown out of the pot. If the lid has been forgotten by mistake, this might have unpleasant consequences. Furthermore, such a solution is only suited for relatively flat and very broad pots because only with such pots can the desired distances be covered by the pivotal movement.

SUMMARY OF THE INVENTION

It is therefore the object of the present invention to improve a pot of the above-mentioned type such that the handling of the strainer body is improved.

In a generic pot this object is achieved in that the handling device comprises a pull element and that the pot body has provided thereon a guiding device in which the pull element is displaceably guided along a predetermined path for pivoting the strainer body.

Although it is already known in the prior art that in particular chain-like pull elements are used for transferring a strainer body from a submerged position into an emerged position, these elements were most of the time passed centrally through the lid of the pot and then dangled downwards on the outside, thereby presenting an obstacle in part. According to further constructions the handling device was additionally locked onto the pot so that the pull means was under a permanent tension. However, with these designs, an unlocking of the lid and serious scalds were observed in part because of the tensile stress of the pull element.

By contrast, the present invention has the advantage that the pull element is exactly guided in a guiding device and is displaceably guided along an exactly predetermined path. This means that the pull element is only displaceable along said predetermined path and does not freely dangle from the pot in the emerged position of the strainer body. Especially with children, freely dangling pull elements or pull elements that could freely be gripped outside the pot have so far been popular toys in the prior art, which partly resulted in accidents by the pot being knocked over due to pulling on the pull element.

Thanks to a diverse design of the guiding device, the invention makes it possible to predetermine the most different paths for movably guiding the pull element. Furthermore, a pulling force on a pull element can be dosed much better, and because of the fact that there is no gearing—in contrast to a pivot lever system, the displacement movement of the pull element can be converted into a direct vertical displacement of the strainer body. The risk of an accident is thereby reduced considerably.

A further essential advantage of the invention is of course the fact that no storage place has to be provided for the strainer body because said body can preferably be moved into a position which is within the pot and above the liquid level. Thus during the whole preparing and subsequent serving process the strainer body remains within the pot body so that the drinking pleasure is not lastingly marred by the cumbersome removal of a strainer body from the pot.

To avoid excessive loads on the pull element, for instance by a sliding movement along an edge, the pull element according to one variant is guided in longitudinally displaceable fashion in the guiding device along a curved path which is in particular convex relative to a pot axis. Thanks to the convexly curved path relative to the pot axis, the pull element remains near the pot so that guiding devices projecting to a superfluously wide extent need not be provided. A guiding along the outer contour of the pot is also possible with such a design. Furthermore, advantageous frictional conditions are created in the guiding device because in the case of a curved path there will be no abrupt rise in frictional forces.

Advantageously, the pull element may be a component which is substantially rigid and adapted to the path predetermined by the guiding device. The term "rigid component" is just to rule out entirely flexible pull elements, such as bands, cords, chains, or the like. The component should be designed such that it does not change its shape in the unloaded state. All of the disadvantages inherent to such flexible pull elements are thereby eliminated. The pull element and the guiding device may be designed as components which can be telescoped into one another, so that a substantially hidden displacement of the pull element takes place, or a displacement adapted to the contour of the pot. Since the pull element is rigid, it can additionally receive bending forces, so that the element can freely project beyond a specific area in a direction transverse to its longitudinal extension. This is e.g. the case when the pull element in the submerged position of the strainer body is mainly moved out of the guiding device. It is thereby possible to assume the most different positions of the strainer body inside the pot body, even if the guiding device is arranged laterally on the pot.

Advantageously, the pull element in an emerged position of the strainer body can mainly be withdrawn into the guiding device and held therein. The bending load which, for instance, a rigid pull element is subjected to in the emerged position is thereby reduced to a very considerable extent. It should be borne in mind that in the emerged position the strainer body with its wet filling has a much greater weight than prior to submersion into the liquid.

As a rule, the prior-art pots have a lid which is detachably mounted on an upper pot opening. The lid can e.g. be inserted into the pot opening and screwed into or onto the pot opening. Furthermore, hinged lids are known that are e.g. pivotably supported at one side on the pot body. To be able to fill the pot body with liquid as much as possible and, nevertheless, to arrange at least the compartment filled with the additional substance outside the liquid, the lid may comprise an interior which is open towards the pot opening and in which the strainer body in the emerged position is arranged at least in part. This results in an additional displacement path for the strainer body and the filling level of the pot is thereby increased. Of course, the strainer body can be fully pivoted into the interior of the lid as well.

For an easier handling of the pot a handle may be arranged on the pot body, the handle forming at least part of the guiding device. Since the handle normally projects laterally from the pot body, there are enough possibilities of arrangement for accommodating a suitable guiding device which provides the desired displacement length of the pull element.

Advantageously, the path which is predetermined by the guiding device can therefore be adapted to the shape of the handle. Such a design is very well compatible with a curved design (sickle shape) of the pull element.

To displace the pull element in an easy way in the area of the handle and to simultaneously shift the strainer body between the submerged and emerged position, the handle may comprise a guide groove as part of the guiding device that substantially extends along the longitudinal extension of said handle and has displaceably supported therein the pull element, which is molded thereon accordingly, between a first position assigned to the submerged position of the strainer body and a second position assigned to the emerged position of the strainer body. The guide groove may e.g. also be provided in the interior of the handle, and in such a case access to the pull element must be provided for. This is a very compact embodiment because the same does not necessarily differ on the outside from conventional pots without a strainer body.

According to a variant the handle, the guide groove and the pull element may be curved substantially in the form of a circular arc and may be insertable into one another. A curved design in the form of a circular arc yields, on the one hand, an advantageous handle which can safely be gripped and, on the other hand, a e.g. rigid pull element can be displaced very easily along a circular path. It goes without saying that due to the displacement along a circular path the strainer body is displaceable not only in its vertical position, but also in its horizontal position.

The pot may be designed such that the upper pot opening is directly formed at the upper end of the pot body. The lid is directly mounted on the pot body. A corresponding spout can also directly be formed in the pot body. In a pot body of glass this can easily be accomplished with a corresponding shape. However, a drawback of such a glass body might be that when the lid is mounted or removed or upon contact of the glass spout with a vessel there might be some damage. To avoid such a damage, an attachment member may be mounted on an upper end of the pot body and may be formed at least with a spout and an upper pot opening. This attachment member may e.g. be made from plastics. Furthermore, the attachment member can be screwed, locked or glued to the pot body made, in particular, of glass. A sealing ring of rubber or the like may be arranged between attachment member and pot body for improved sealing.

For easier handling and manufacture of the pot the handle may be molded onto the attachment member.

In the case of a pot body without attachment member or also with attachment member, the handle can be also directly fastened to the pot body in a detachable manner.

In particular upon use of easily adhesive materials, such as glass, as the material for the pot body, the handle may also be glued to the pot body. This joining technique can be controlled very easily even at the temperatures prevailing in such a case.

To guide the pull element easily from the strainer body towards the handle, an opening for the pull element may be formed between lid and pot body or attachment member or in the attachment member, the opening being part of the guiding device.

A simple embodiment of the pull element, which is easily displaceable along the guide groove at the same time, may be a pull element made from a flat section having at least one slide surface which is movable along the guide groove.

For a simple manufacture of the handle with a corresponding guide groove, the groove may be formed from the outside of the handle. The flat section may e.g. be embedded in such a guide groove to be flush therewith. To this end, the guide groove in the handle may advantageously be substantially V-shaped in cross section and the flat section of the pull element may have a correspondingly adapted cross-section so that the pull element is substantially guided in the guide groove to be substantially flush with the outer contour of the handle.

It must here be regarded as an advantage when the pull element in the area of the handle comprises at least one handling device. Such a handling device may e.g. be a cam projecting from the flat section or an outwardly protruding eyelet or ring. Such a handling device can also be inserted at a later time into a corresponding bore in the flat section, in particular after passage of the pull element, through the above-mentioned opening. Moreover, the handling device can be secured in a detachable way.

To be able to secure the strainer body in a simple manner to the pull element, the element may be designed as a holding hook at its end assigned to the strainer body. Said holding hook can engage into a corresponding holding opening on the strainer body and can be detachably secured thereto.

In particular, in order to safely hold the strainer body in its emerged position and to prevent an automatic return movement into the submerged position, the guiding device and/or the handle may have assigned thereto an arresting device for fixing the pull element at least in its second position. Such an arresting device can be designed in different ways. It could for instance be a locking opening provided in the guiding device, which is engaged by a corresponding locking projection when the second position has been reached. A second locking opening may also be provided for fixing the submerged position.

For easily producing a corresponding arresting device, which automatically fixes the pull element in a second position, the arresting device may be designed as a constricted portion of the guiding device. Thanks to a simple frictional engagement between guiding device and pull element, the latter is thereby held in its second position and can nevertheless be displaced towards the first position by applying just a small force.

It is also possible to design the arresting device in the form of a locking hook on the pull element and of an associated locking nose in the guiding device. A specific position of the strainer body is then assigned to each locking position. In particular, the locking hook can be formed on the end portion of the pull element and the locking nose can be formed in the guide groove of the handle. The locking action is then performed in integrated fashion in the area surrounded by the handle and thus at a hidden place.

Advantageously, a separate locking nose may be arranged in the guide groove for each position of the pull element so that the pull element must just comprise a locking hook to occupy the different positions.

In particular in the case of a pot body made from glass, it is an advantage when the pot body comprises a lower base member connected to the handle and/or the attachment member. This base member may be a detachable part of the pot body and e.g. be made from plastics or metal in the case of a pot body made of glass.

The base member can be made detachable by the measure that the member is detachably clamped via a clamping mechanism to the lower portion of the pot body. Thus, for hygienic reasons the base member can be removed for cleaning purposes. As a rule, the pot body can also be put down without the base member so that a base member can alternatively be used for decorative purposes. The base member can also be designed differently with different decorations.

Furthermore, it is possible that the base member consists of a thermally stable material, in particular of metal. Stainless steel is here particularly suited. This embodiment has the additional advantage that such a pot can be put with its metal base on a pot warmer because the latter develops a considerable amount of heat which can easily be endured by the base member material.

To securely fasten the handle relative to the pot body, the pot body may be provided on its outside with at least one circumferential groove for receiving a wire secured with both of its ends to the handle. Such a wire surrounds the pot body along the circumferential groove, thereby securing the handle to the pot body thanks to the fastening of the two wire ends to the handle. Of course, two wires of this type may also surround the pot body in spaced-apart relationship with one another and be secured to the handle. The handle can be fixed in an improved way relative to the pot body when the two ends of the wire are guided laterally along the guide groove for the pull element in the handle into the vicinity of the lid.

The contact of the handle with the pot body can further be improved thereby and the pot can be carried more safely when the handle comprises an outer leg formed with the guiding device and an inner leg resting on the outside of the pot body, the legs being interconnected at their ends such that they enclose a grip opening. The grip opening is used for carrying the pot, and the outer leg can be gripped around with the grip opening.

To be able to connect the base member to the handle or on the attachment member, the base member may comprise a connection carrier extending towards handle or lid or attachment member along the outside.

To be able to fill and also to clean and empty the strainer body in a simple way, the body may be foldable and/or dividable into about two halves. As a rule, the strainer body is round or oval and unfoldable or dividable approximately along its equator. Preferably, the strainer body can be divided into a left and right strainer body half substantially in parallel with or in a plane formed by the pull element. In particular when a strainer body half is removed and the other one is still connected to the pull element, the pull element can be used together with the one strainer body half as a metering spoon or a scoop when a detachable connection has been chosen between guiding device and pull element.

The end of the pull element which is assigned to the strainer body may have arranged thereon a ring on which at least one of the two strainer body halves can be mounted and connected to the strainer body for the formation thereof. The strainer body halves can thereby be connected very easily to the pull element. Such a connection can be provided with an elegant design and is very interesting, especially with respect to hygienic reasons, because the transition between ring and pull element can be designed such that deposits cannot collect at said place.

To this end the at least one strainer body half can be connected by means of a bayonet-like catch either to the other half or to the ring. Such a connection can very easily be opened for filling the strainer body with additional substances.

In most cases an embodiment is adequate in which the one strainer body half is firmly connected to the pull element and the other strainer body half is detachably connected or connectable to the pull element. This if of particular advantage when the strainer body half which is firmly connected to the pull element is to be used together with said element as a metering spoon or a scoop. Moreover, the fixed strainer body half can be gripped in an improved way for detaching the other strainer body half and therefore serves as a handling device for opening and closing the strainer body.

For optical reasons and for an improved control of the interior of the pot, the pot body may be made from a transparent heat-resistant material, in particular glass.

For an easy displacement of the strainer body, in particular, along a curved path, it is advantageous when the pot body is bulged.

A plastic material is normally also used for the material of the lid, and the plastic material may be electroplated for an improved optical appearance. The lid can also be made from a thin metal.

As a rule, the pull element is made—like the above-mentioned wires—from a metal, such as aluminum, steel, or the like. This is also applicable as a rule to the strainer body. A design of plastics is also possible.

Like the handle, the base member may be made from plastics or also metal.

BRIEF DESCRIPTION OF THE DRAWINGS

The present invention shall now be explained and described in more detail with reference to advantageous embodiments taken in conjunction with the figures which are attached to the drawing, in which:

FIG. 2 is a top view on the pot according to FIG. 1;

FIG. 3 is a side view of a second embodiment of a pot according to the invention;

DETAILED DESCRIPTION OF THE PREFERRED EMBODIMENTS

Figure 1:
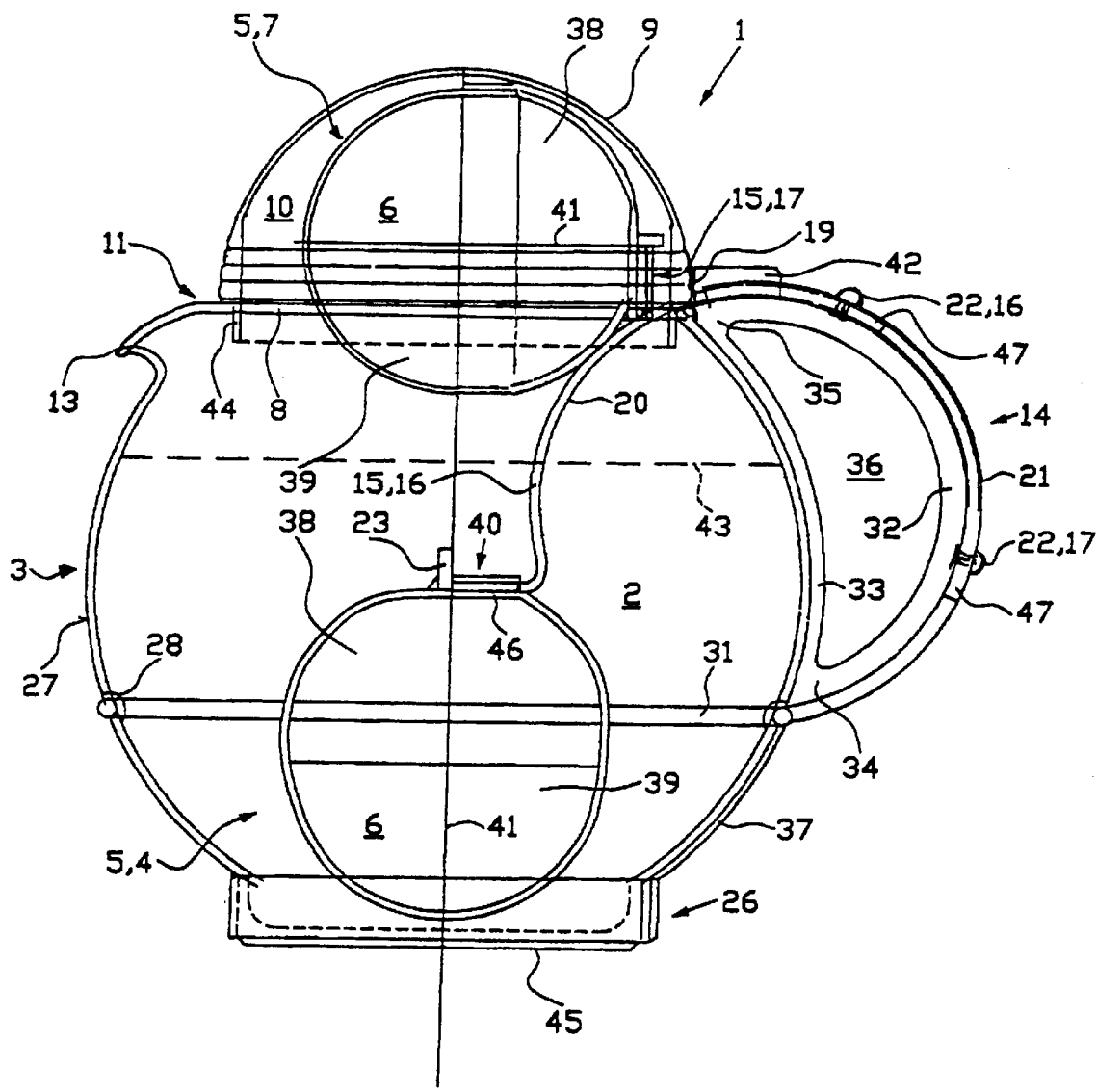
FIG. 1 is a vertical section through a tea/coffee pot according to a first embodiment.

FIG. 1 is a vertical section through a first embodiment of a tea/coffee pot 1 according to the invention. A liquid 2 is filled into a pot body 3 of the pot 1 up to a level 43, which is shown in broken line. The pot body has a bulged outside 27, with a handle 14 for handling the pot 1 being arranged at one side on said outside.

The upper end 11 of the pot body 3 has arranged thereat an upper pot opening 8 with a spout 13 opposite to the handle 14. A detachable lid 9 is mounted on the upper pot opening 8. The lid has approximately the shape of a semi-sphere with a hollow interior 10 which is opened towards the upper pot opening 8. A rim 44 which can be inserted into the upper pot opening 8, and by which the lid 9 is held on the pot body 3 and the upper pot opening 8 is sealed at the same time, projects from the lid 9.

At the lower end of the pot body 3 opposite to the lid 9, there is arranged a base member 26 in which the pot body 3 is e.g. held in form-fit or force-locked fashion. For a further stabilization of the pot 1 a connection carrier 37 is connected to the base member 26, for instance by welding, the carrier extending along the outside 27 of the pot body 3 towards handle 14.

The handle 14 comprises an outer leg 32 approximately shaped in the form of a partial circle, as well as an inner leg 33 resting on the outside 27 of the pot body 3.

The legs are interconnected at their lower and upper ends 34, 35 and enclose a grip opening 36. The upper end 35 of the legs 32, 33 is arranged laterally next to the upper end 11 of the pot body 3, and a shoulder portion 42 projects upwards from the outer leg 32 and rests on the lid 9 with its end facing said lid.

Two end sections of a round wire 31 are guided along an outside 21 of the outer leg 32 (see also FIG. 2), the round wire 31 being guided around the pot body 3 in a circumferential groove 28 formed in the exterior 27 of the pot. The circumferential groove 28 extends substantially in parallel with a support surface 45 on a bottom side of the base member 26. The end sections of the wire 31 are guided, see FIG. 2, up to the shoulder portion 42 along the outside 21 of the outer leg 32 and are there inserted and fastened with their ends 29 and 30.

The connection carrier 37 extends along the exterior surface 27 of the pot body 3 approximately up to the circumferential groove 28 and is there normally secured to the wire 31 by being welded thereto.

Inside the pot body 3 a strainer body 5 is displaceably supported between a lower submerged position 4 and an upper emerged position 7. In the submerged position 4 the strainer body 5 is adjacent to the base member 26 and partly arranged therein. In the emerged position 7 the strainer body 5 is moved into the hollow interior 10 of the lid 9 and is arranged above the liquid level 43. The strainer body 5 has formed therein at least one compartment 6 into which an additional substance, such as tea leaves, ground coffee, or the like, can be filled. In the submerged position 4 the additional substance is in contact with the liquid 2, which is normally hot, and a beverage, such as tea, coffee, or the like, is prepared. In the emerged position 7 the additional substance is separated from the liquid.

As a rule, the strainer body 5 is composed of a first half and a second half 38, 39, the halves being in contact with one another along a division 41 approximately along an equator of the substantially spherical strainer body 5. The two halves 38, 39 can be screwed to one another. Furthermore, half 38, for instance, see emerged position 7, may be pivotably supported relative to the second half 39 in the area of the division 41 for opening the strainer body 5. Various mechanisms, which are per se known, can be used for closing the strainer body.

A pull element 15, in the form of a sickle-shaped arm, is detachably secured laterally on the strainer body by means of its end 40, which is designed as a holding hook 23. The holding hook 23 engages into a corresponding holding sleeve 46 which in the illustrated embodiment is arranged on the second half 39 of the strainer body 5. The pull element 15 extends in curved fashion with a substantially identical radius of curvature as the outer leg 32 of the handle 14. An opening 19 for guiding the pull element 15 therethrough is formed between handle 14 and lid 9 in the area of the upper pot opening 8 and is continued in the shoulder portion 42. The pull element is guided through said opening to such an extent that it projects from the shoulder portion 42 on the outside 21 of the handle 14. The outside 21 of the handle 14 has formed thereon a guiding device for guiding the pull element 15 formed from a flat section, the pull element being displaceable along said guiding device for moving the strainer body 5 from the submerged position into the emerged position, and vice versa. A flat side 20 rests as a slide surface on the outside 21 in the guide groove 18, see FIG. 2.

To be able to easily move the strainer body manually by means of the pull element, a handling device 22 is arranged on the pull element 15. This device may e.g. be designed as a cam secured in a hole of the pull element 15.

When the strainer body 5 is in the submerged position 4, the pull element 15 is arranged in its first position 16 in which the handling device 22 is arranged adjacent to the shoulder portion 42. For moving the strainer body 5 into the emerged position 7, the pull element 15 is displaced by means of the handling device 22 along the guide groove 18 towards base member 26 until it is arranged in its second position 17 corresponding to the emerged position 7 of the strainer body 5.

Figure 4:
FIG. 4 shows an embodiment of an arresting device for use in the pot according to the invention.

To hold the pull element 15 in the second position 17 and thus the strainer body 5 in the emerged position 7, the guide groove 18, see FIG. 4, may comprise an arresting device 24 in the form of a constricted portion 25. An end 47 of the pull element 15 can be pushed into this constricted portion in the second position 17 and pulled out again for return into the first position 16.

FIG. 2 is a top view on the pot 1 according to FIG. 1. For the sake of simplification the remaining pot body 3, for instance with the spout 13, is not shown.

As can in particular be seen in FIG. 2, ends 29, 30 of wire 31 are inserted into the shoulder portion 42 and secured there. The ends 29 and 30 are laterally offset and arranged in parallel with the guide groove 18 with the pull element 15 arranged in said groove.

It should here be noted that the guide groove 18 may also be designed as a hollow guide within the outer leg 32 of the handle 14, and that in this instance it is only the handling device 22 that projects outwards for manual operation.

FIG. 3 shows a second embodiment of the pot 1 according to the invention. Identical parts are provided with identical reference numerals and are only referred to in part.

The second embodiment differs from the first one, in particular, in that the pot body 3 is arranged between the base member 26 and an upper attachment member 12. The attachment member 12 is attached to the upper end 11 of the pot body and is secured thereto. The upper pot opening 8 is formed accordingly by an upper end of the attachment member 12 and can be closed by a lid 9. The attachment member 12 has arranged thereon a spout 13 and, opposite thereto, a handle 14. The handle 14 substantially comprises only one outer leg 32 and is otherwise formed as the handle 14 according to FIG. 1 with guiding device 18 and pull element 15 which is slidably supported therein and includes handling device 22.

As a further difference to the first embodiment, no additional wire 31 is guided in FIG. 3 in a circumferential groove 28 around the pot body 3 and, instead of this, the connection carrier 37 is guided along the whole outside 27 of the pot body 3 from the base member 26 to the attachment member 12. The connection carrier may e.g. be configured as a double wire which is secured both in the base member 26 and in the attachment member 12. Attachment member 12 and base member 26 may be made from plastics and connected to the pot body in form-fit or force-locked fashion. In particular in the area of the attachment member 12, a rubber ring (not shown) may be arranged between said attachment member and the pot body for mutual sealing.

Furthermore, base member 26 and/or attachment member 12 may be made from a metal which is connected by welding to the double wire as the connection carrier 37.

A further embodiment of the present invention shall now be explained in more detail with reference to FIGS. 5 to 10. When identical or similar components are referred to, identical reference numerals will be used. Only fundamental differences over the preceding embodiments will be discussed in the main, so that the above description will apply analogously.

The main difference consists in principle in the design of the pull element 15 with the strainer body 5 and the associated guiding device.

Figure 8:
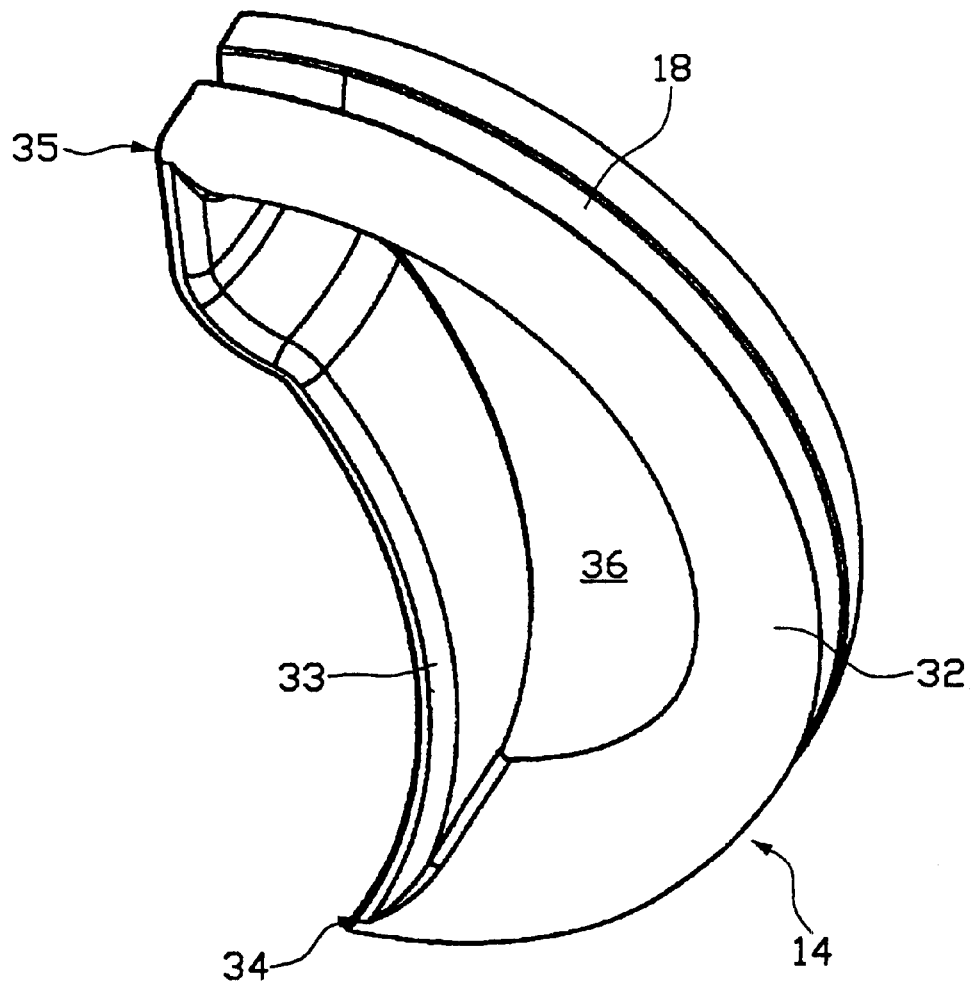
FIG. 8 is a perspective side view of the handle of the pot of FIG. 5.

As can in particular be seen in FIG. 8, the grip which is laterally attached to the pot body 3 is provided in its arcuate outer leg 32 with a guide groove 18 extending from the upper end 35 to the lower end 34. The guide groove 18 extends over the whole length of the outside of the outer leg 32 and has a substantially V-shaped form when viewed in cross section. A central line of the guide groove 18 is located in one plane with the pot axis A. The guide groove 18 is open to the outside and just covered by the shoulder portion 42 of the lid 9 in its area assigned to the upper end 35, so that a closed guide is formed in said area for the pull element 15. Therefore, the lid 9 is detachably locked to the pot by means of a locking device 48. The locking device 48 is located on the rim 44 at the lower edge of the lid 9 which only comprises penetrations in the area of the spout 13 and for forming the opening 19 (for passing the pull element 15 therethrough).

The guide groove 18 has a substantially uniform depth and extends, like the outer leg 32 of the handle 14, in the form of a circular arc.

The cross-sectional shape of the sickle-shaped pull element 15 is adapted to the V-shaped cross-sectional form of the guide groove 18. The pull element is thus also V-shaped in cross section and may be displaceably arranged in the guide groove 18 such that the outside 49 of the pull element 15 is substantially flush with the outside 21 of the handle 14. The length of the pull element 15 is chosen such that substantially a semi-ring is formed with substantially the same radius as the guide groove 18.

The outside 49 of the end 47 of pull element 15 has arranged thereon a handling device 22 in the form of an annular eyelet by which the pull element 15 can be displaced in guide groove 18. On the inside of the pull element 15 a locking hook 50 is provided at end 47, which locking hook can be locked with correspondingly designed locking noses 51 onto the base of the guide groove 18. In the present embodiment two locking noses 51 are provided. The upper locking nose 51 represents the submerged position 4 of the strainer body 5, and the lower locking nose 51 the emerged position 7 of the strainer body 5. The arrangement of the upper locking nose 51 is chosen such that the strainer body 5 in the submerged position 4 is still spaced apart from the bottom of the pot body 3 to some extent and does not rest thereon.

Figure 9:
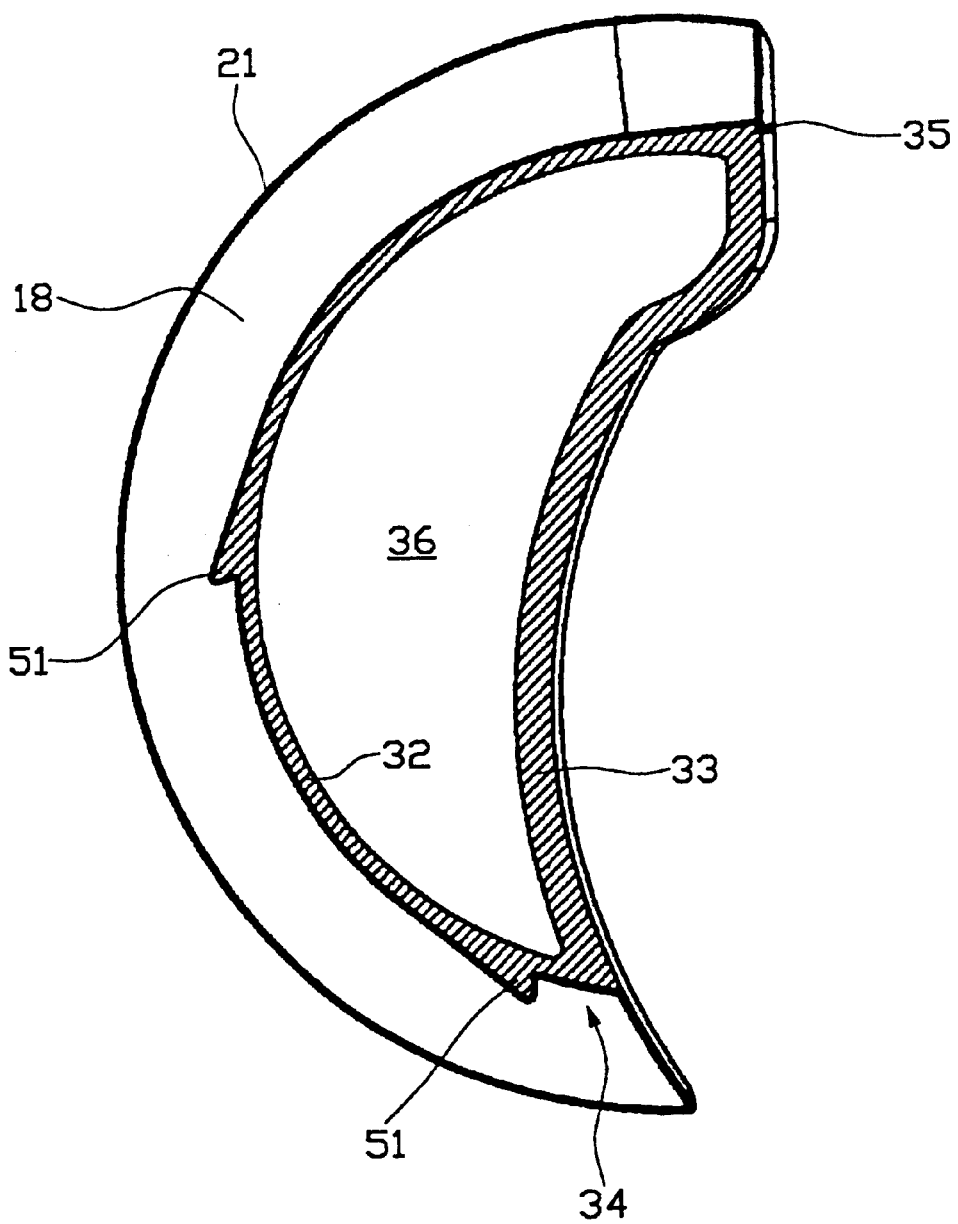
FIG. 9 shows the handle of FIG. 8 in full section.

The locking noses 51 can very clearly be seen, in particular, in FIG. 9. They are spaced apart by about 70° on the circular arc of the guide groove 18.

Figure 10:
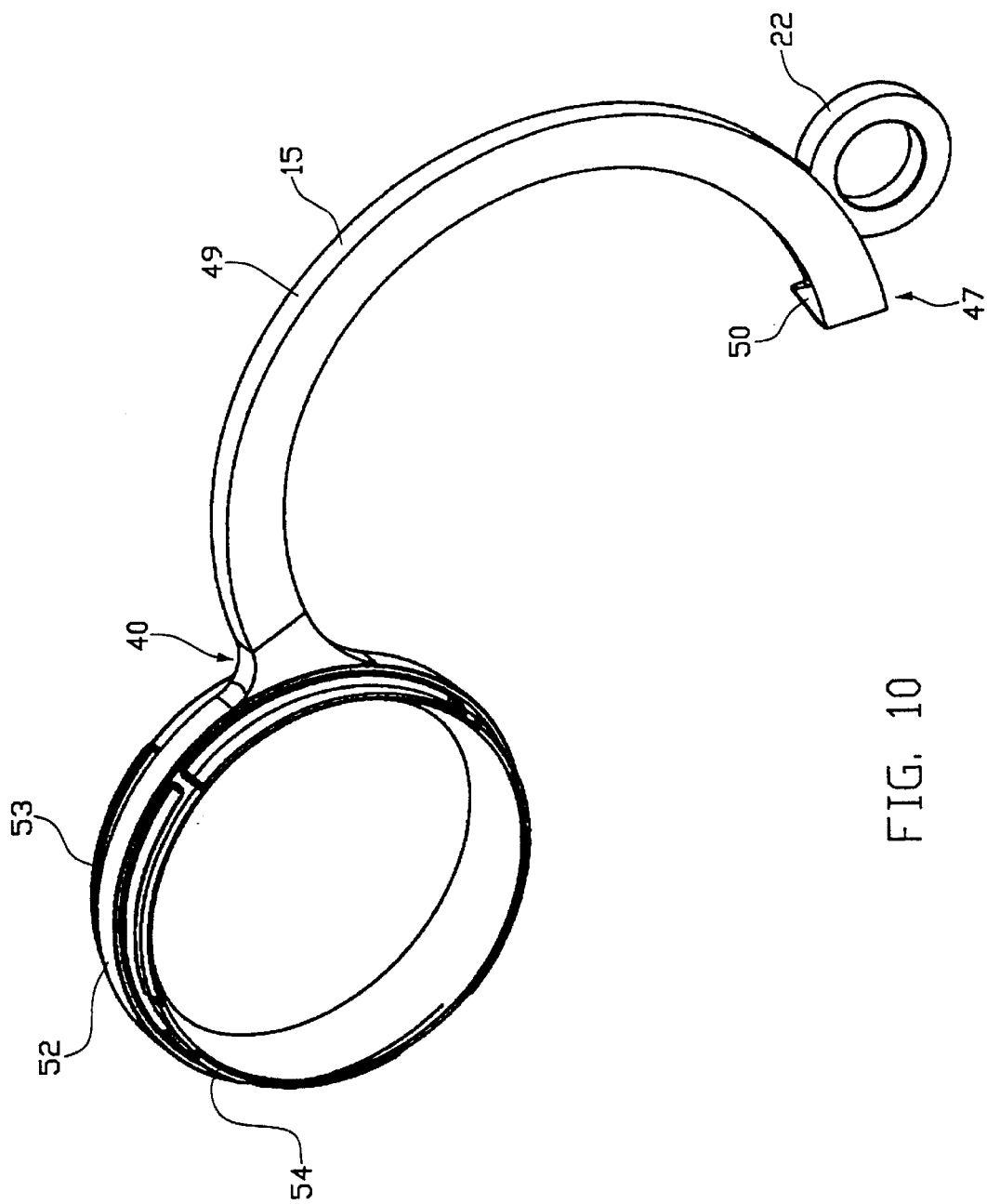
FIG. 10 shows the pull element of FIG. 5 with a ring molded thereon, in an enlarged perspective side view.

As can be seen with reference to FIG. 10, a holding ring 52 is molded onto the end 40 of the pull element 15 and has a circular cross-section which is substantially oriented in extension of or in parallel with the plane formed by the sickle-shaped element 15. The holding ring 52 is made integral with the pull element 15, so that the whole element shown in FIG. 10 can e.g. by produced by way of injection molding. A respective bayonet-catch receiving means 53 and 54 is arranged at both ends of the holding ring 52. The diameter of the holding ring 52 substantially corresponds to the diameter of the spherical strainer body 5, of which the holding ring 52 is an integral part. At both sides of the holding ring 52, a first half 38 and a second half 39 of the strainer body 5 that have about the shape of a hollow semisphere are respectively mounted and arrested by means of the bayonet catch 53 and 54, respectively. The first and second halves 38, 39 are then provided with respective strainer openings.

Since in the unmounted state of the lid 9 the pull element 15 with the strainer body 5 can very easily be removed from the pot 1, said unit can be cleaned easily. Moreover, it is possible to use said element as a metering spoon or a scoop when one of the two halves 38 and 39, respectively, has been unscrewed.

As soon as the lid 9 with its locking means 48 has been arrested on the pot body 3, the pull element 15 can no longer be removed from opening 19.

In addition, the embodiment shown in FIGS. 5 to 10 includes a handling device 55 in the form of a hollow sphere on the tip of the dome-shaped lid 9. The base member 26 consists of a metallic support ring 56 which is mounted on the lower section of the pot body 3 made from glass, and which by reason of the shape of the lower end of the pot body 3 is resiliently locked in a detachable manner to the body or is connected thereto by means of a clamping mechanism. Furthermore, a pot warmer 57 is provided and may have mounted thereon in substantially form-fit fashion the support ring 56.

A few remarks will now be made on the function and operation of said embodiment.

Figure 5:
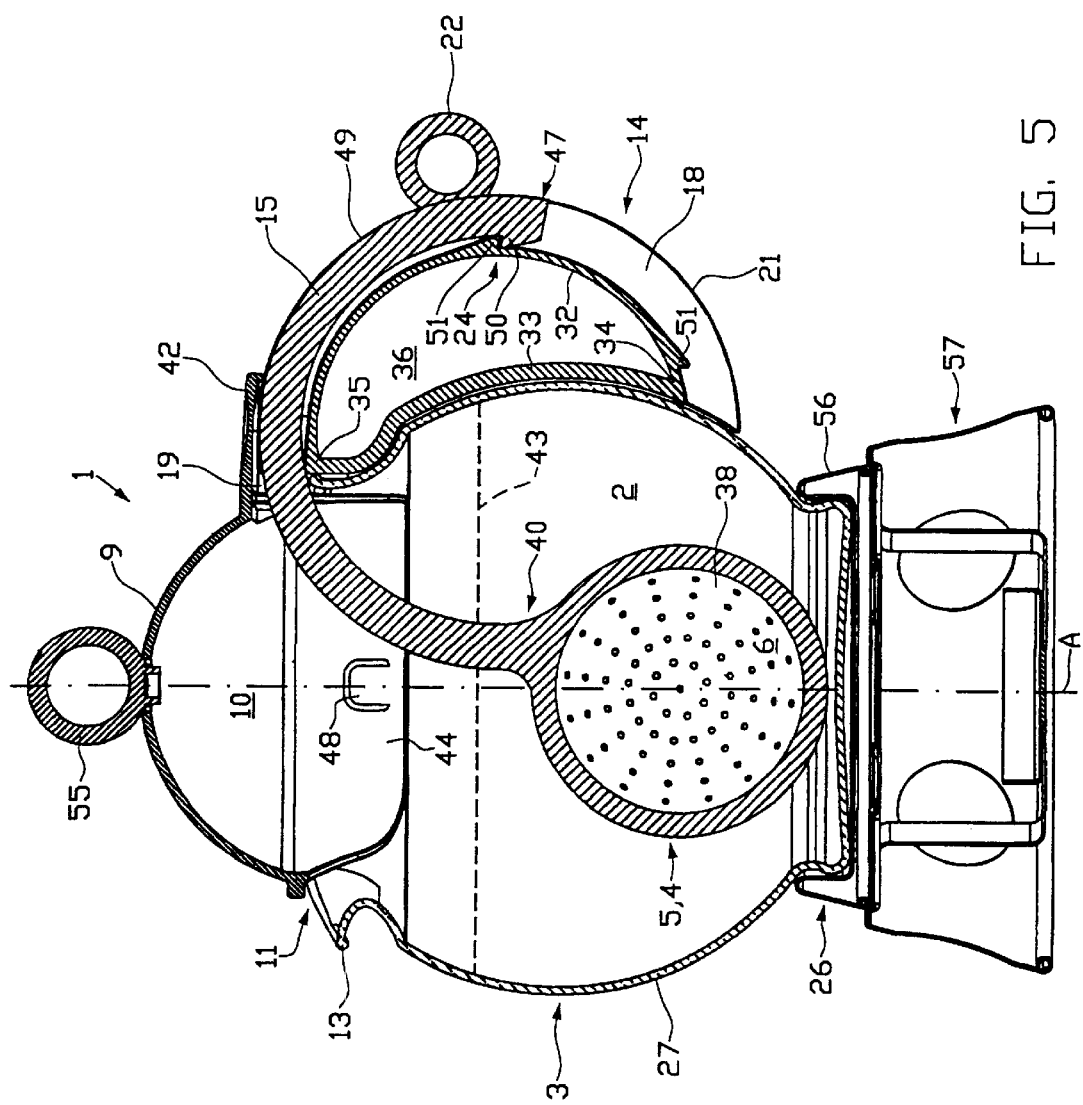
FIG. 5 is a full section through a third embodiment of a pot according to the invention.
Figure 6:
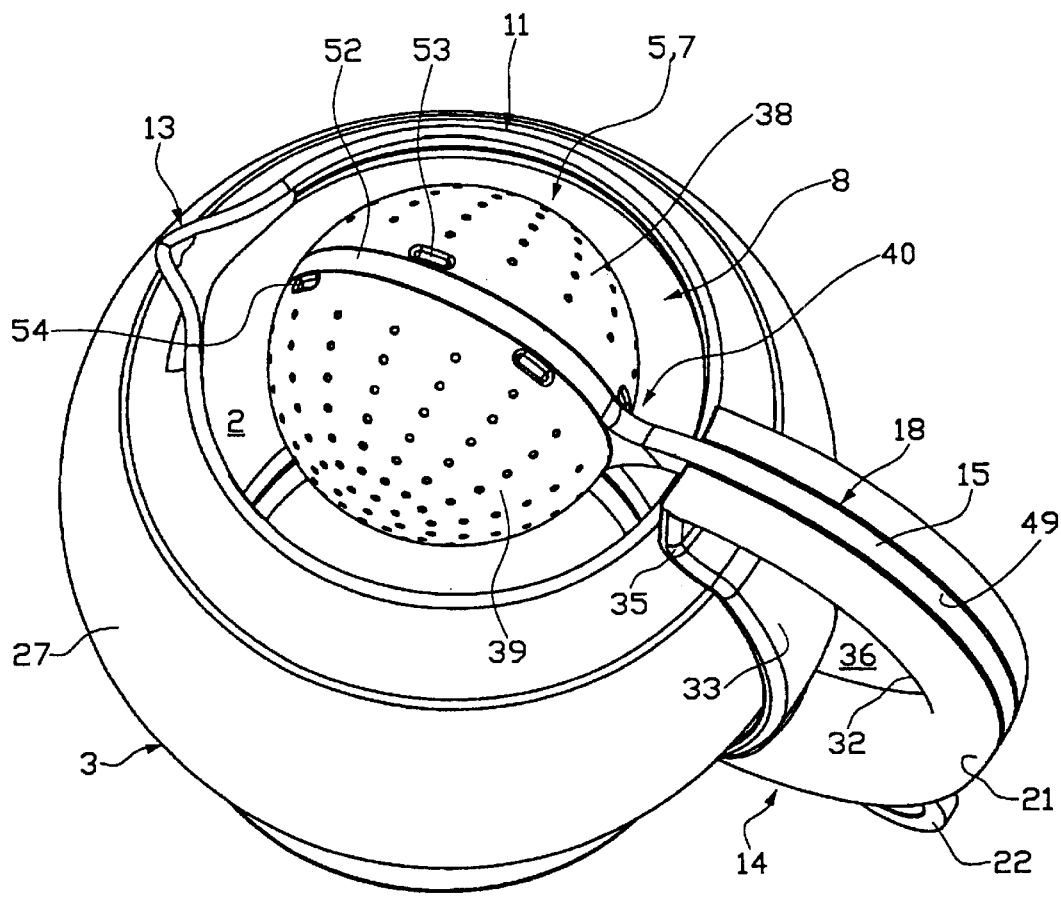
FIG. 6 is a perspective top view on the pot without lid of FIG. 1, with the strainer body being in the emerged position.
Figure 7:
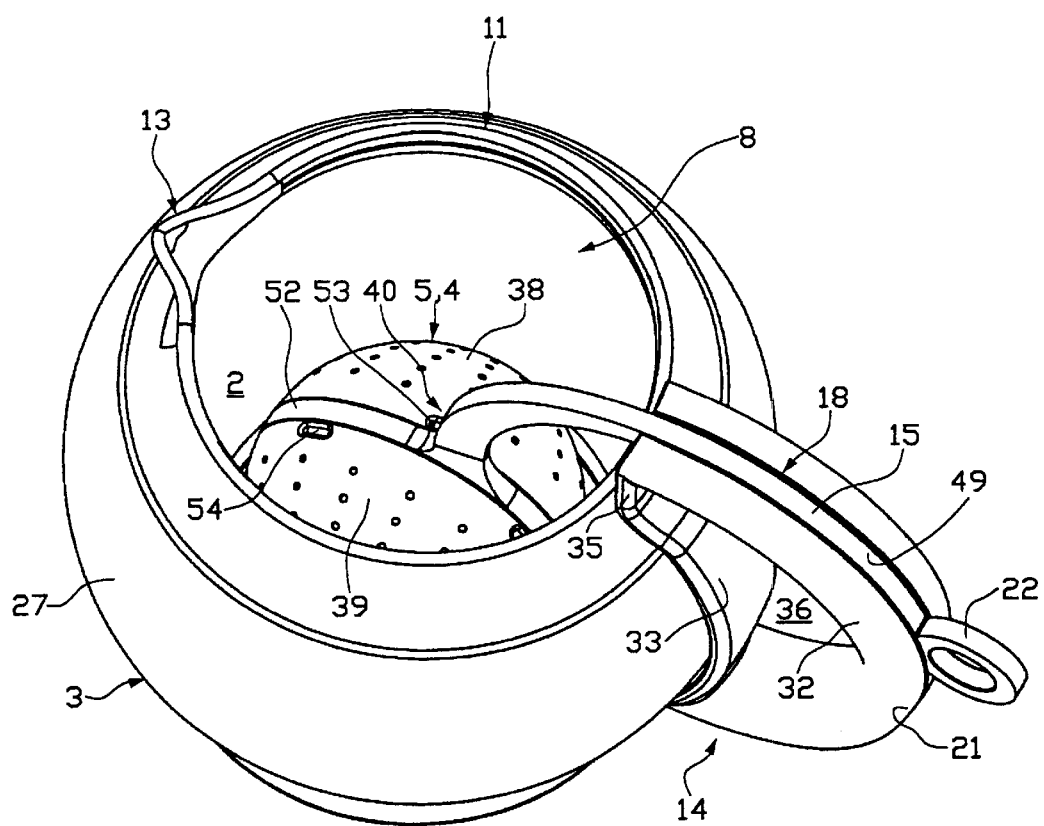
FIG. 7 is a view similar to FIG. 6, with the strainer body being in its submerged position.

In FIG. 5, the arrangement of the strainer body 5, which is also shown in FIG. 7, is drawn in the submerged position 4. FIG. 7 shows how the two halves 38 and 39 of the strainer body are connected to the holding ring 52. In this position the locking hook 50 is locked with locking nose 51 so that the position of the strainer body 5 is exactly defined. In this position the spherical strainer body is located with its center point substantially exactly on the pot axis A. If a user wishes to transfer the strainer body 5 from the submerged position 4 into the emerged position 7 (as shown in FIG. 6), he will grip with his finger through the eyelet-shaped handling device 22 and pull the substantially rigid pull element 15 downwards. On account of the sickle-shaped form of the pull element 15 and the guide in the guide groove 18 together with the support of the opening 19 and the shoulder 42 on the lid 9, the pull element 15 is moved along an exactly predetermined path. In the instant case the path is circular. This means that the pull element 15 cannot choose another way. The pull element 15 will be displaced by means of the handling device 22 until the locking hook 50 is locked with the lower locking nose 51. During this operation the strainer body 5 is lifted at the same time because the pull element 15 is more and more moved into the guiding device.

The arcuate shape of the pull element 15 and of the guiding device, the arrangement of the strainer body 5 as well as the position of the handle 14 are chosen with respect to one another such that the strainer body 5 in the emerged position is also positioned again with its center point on the central main axis A. Thanks to this configuration the strainer body only requires little lateral freedom of movement to be transferred from the lower into the upper position. Since a considerable vertical adjustment can be achieved with this displacement mechanism, this mechanism can also be used in slim or high pots.

Thanks to the exact guidance of the pull element the user can very accurately control this process. The speed at which the strainer body 5 emerges from the liquid 2 will never be so high that there is a risk of splashing.

In addition it should be noted that in the various embodiments the pull element 15 is not only subjected to a tensile load, but also to a bending load, and should therefore have a sufficient strength. However, the bending load decreases with an increasing withdrawal of the pull element 15 so that a heavy strainer body 5 containing a wet load will not automatically effect a higher load.

What is claimed is:

1. A tea/coffee pot comprising:
   a pot body designed to be filled with a liquid;
   a strainer body in said pot body that is pivotable by means of a handling device between a submerged position and an emerged position, said strainer body comprises at least one compartment for receiving a substance,
   wherein said handling device comprises a pull element for pivoting said strainer body, and
   wherein said pot body includes a guiding device in which said pull element is displaceably guided in longitudinally displaceable fashion along a predetermined curved path for pivoting said strainer body, the curved path being convex relative to an axis of the pot.

2. The pot according to claim 1, wherein said pull element is a substantially rigid component adapted to the path predetermined by said guiding device.

3. The pot according to claim 1, wherein said pull element in the emerged position of said strainer body is predominantly withdrawn into said guiding device and held therein.

4. The pot according to claim 1, further comprising a lid which is mountable on an upper pot opening, wherein said lid has an interior which is open towards said upper pot opening and in which said strainer body in said emerged position is arranged at least in part.

5. The pot according to claim 1, further comprising a handle on said pot body, said handle forming at least part of said guiding device.

6. The pot according to claim 5, wherein the path predetermined by said guiding device is adapted to the shape of said handle.

7. The pot according to claim 5, wherein said handle comprises a guide groove as part of said guiding device which extends substantially along the longitudinal extension of said handle and in which said pull element correspondingly molded thereon is displaceably supported between a first position assigned to the submerged position and a second position assigned to the emerged position.

8. The pot according to claim 5, wherein entireties of said handle, said guide groove and said pull element are substantially curved in the manner of a circular arc and are insertable into one another accordingly.

9. The pot according to claim 4, wherein said upper pot opening is at said upper end of said pot body.

10. The pot according to claim 5, further comprising an attachment member mounted on an upper end of said pot body and is formed at least with a spout and an upper pot opening.

11. The pot according to claim 10, wherein said handle is molded onto said attachment member.

12. The pot according to claim 5, wherein said handle is detachably secured to said pot body.

13. The pot according to claim 5, wherein said handle is glued to said pot body.

14. The pot according to claim 4, further comprising an opening between said lid and said pot body for passing said pull element therethrough, said opening forming part of said guiding device.

15. The pot according to claim 7, wherein said pull element has a flat section having at least one slide surface which is movable along said guide groove.

16. The pot according to claim 7, wherein said guide groove is formed on an outside of said handle.

17. The pot according to claim 7, wherein said guide groove in said handle is substantially V-shaped in cross-section, and said flat section of said pull element has a correspondingly adapted cross-section so that said pull element is guided in said guide groove to be substantially flush with the outer contour of said handle.

18. The pot according to claim 5, wherein said pull element comprises a handling device in the area of said handle.

19. The pot according to claim 1, wherein said pull element has a holding hook at its end assigned to said strainer body.

20. The pot according to claim 5, wherein one of said guiding device and said handle has an arresting device for fixing a position of said pull element.

21. The pot according to claim 20, wherein said arresting device is a constricted portion of said guide groove.

22. The pot according to claim 1, further comprising an arresting device in the form of a locking hook on said pull element and an associated locking nose in said guiding device.

23. The pot according to claim 22, wherein said locking hook is on an end portion of said pull element and said locking nose is in said guide groove of said handle.

24. The pot according to claim 7, further comprising a separate locking nose in said guide groove for each position of said pull element.

25. The pot according to claim 10, wherein said pot body comprises a lower base member connected to said handle.

26. The pot according to claim 25, wherein said base member is detachably clamped by means of a clamping mechanism to a lower portion of said pot body.

27. The pot according to claim 25, wherein said base member is made from a thermally stable material.

28. The pot according to claim 5, wherein said pot body is on an outside thereof with at least one circumferential groove for receiving a wire which is secured with both of its ends to said handle.

29. The pot according to claim 28, wherein said two ends are laterally guided along said guide groove for said pull element in said handle.

30. The pot according to claim 5, wherein said handle comprises an outer leg formed with said guide groove and an inner leg resting on an outside of said pot body, said legs being interconnected at ends thereof to enclose a grip opening.

31. The pot according to claim 25, wherein said base member comprises a connection carrier which extends in the direction of said handle and is connected thereto.

32. The pot according to claim 1, wherein said strainer body can be at least one of unfolded and divided into two halves.

33. The pot according to claim 1, wherein said strainer body is divided into a left and right strainer body half substantially in parallel with or in a plane formed by said pull element.

34. The pot according to claim 32, wherein an end of said pull element assigned to said strainer body has thereon a ring on which at least one of said two strainer body halves is mountable.

35. The pot according to claim 34, wherein said at least one strainer body half is connected by means of a bayonet-like catch to the other strainer body half or to said ring.

36. The pot according to claim 32, wherein one of said two halves is fixedly connected to said pull element and the other of said two halves is detachably connected to said pull element.

37. A pot comprising:
a pot body with a handle having a guide groove therein that defines a circular arc path;
a strainer body that moves within said pot body in a circular arc concentric with the circular arc defined by said guide groove; and
a pull element attached to said strainer body and sliding in said guide groove.

38. A pot comprising:
a pot body with a handle having a guide groove therein;
a strainer body that moves within said pot body
a pull element attached to said strainer body and moving along said guide groove, said pull element being a circular arc over substantially all of its length even when said pull element extends from said guide groove.

39. The pot of claim 38, wherein said strainer body moves in a circular arc concentric with the circular arc of said pull element.

* * * * *